United States Patent [19]

Shimano

[11] 4,437,848
[45] Mar. 20, 1984

[54] DERAILLEUR FOR A BICYCLE

[75] Inventor: Keizo Shimano, Sakai, Japan

[73] Assignee: Shimano Industrial Company Limited, Osaka, Japan

[21] Appl. No.: 241,642

[22] Filed: Mar. 9, 1981

[30] Foreign Application Priority Data

Mar. 15, 1980 [JP] Japan ................................ 55-33684
Sep. 19, 1980 [JP] Japan ........................... 55-134347[U]
Sep. 19, 1980 [JP] Japan ........................... 55-134348[U]
Sep. 19, 1980 [JP] Japan ........................... 55-134349[U]

[51] Int. Cl.³ .............................................. F16H 9/00
[52] U.S. Cl. ..................................................... 474/82
[58] Field of Search ................... 474/80, 82; 280/236, 280/238; 474/82

[56] References Cited

U.S. PATENT DOCUMENTS

| | | | |
|---|---|---|---|
| 3,974,707 | 8/1976 | Nagano | 474/82 |
| 4,030,375 | 6/1977 | Nagano | 474/82 |
| 4,106,356 | 8/1978 | Nagano et al. | 474/82 |
| 4,198,873 | 4/1980 | Nagano et al. | 474/82 |
| 4,229,987 | 10/1980 | Fujimoto | 280/236 |
| 4,306,871 | 12/1981 | Nagano | 474/82 |

Primary Examiner—John E. Murtagh
Assistant Examiner—Andrew Joseph Rudy
Attorney, Agent, or Firm—Stevens, Davis, Miller & Mosher

[57] ABSTRACT

A derailleur for a bicycle, comprising a derailleur body provided with a fixing member and a four link parallelogram mechanism, the derailleur body being supported swingably with respect to the fixing member, and between the fixing member and the derailleur body is interposed an intermittent feed mechanism, so that a control wire is operated to allow the derailleur body to swing intermittently corresponding to the speed change stages with, respect to the fixing member, and thereafter, the link mechanism at the derailleur body is transformed, thereby switching a driving chain to a desired one of multistage sprockets.

14 Claims, 22 Drawing Figures

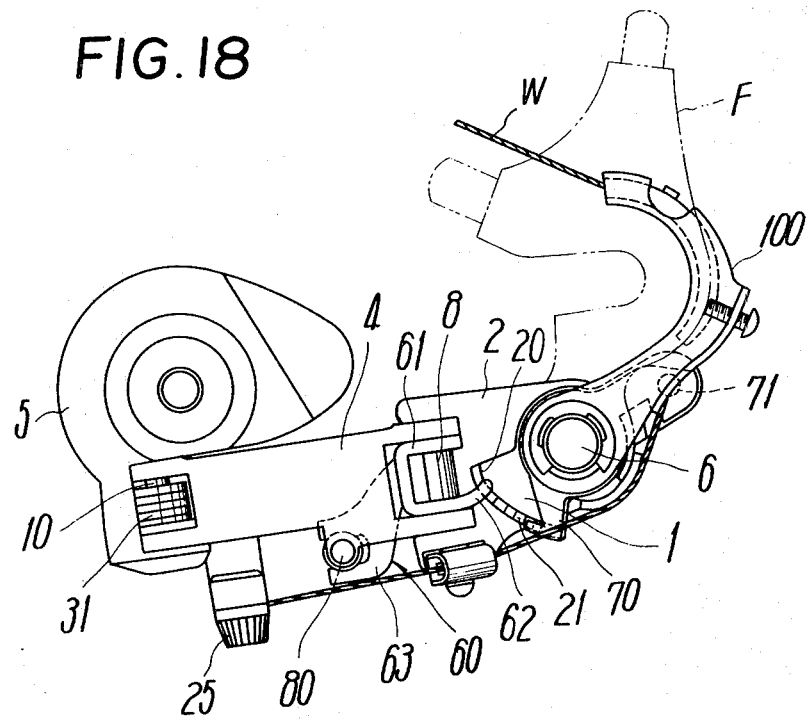
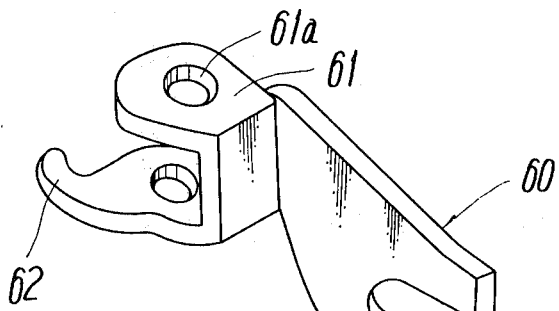
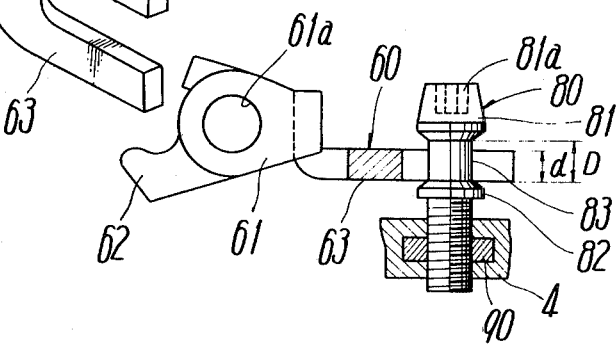

DERAILLEUR FOR A BICYCLE

FIELD OF THE INVENTION

This invention relates to a derailleur for a bicycle, and more particularly to a derailluer for switching a driving chain to a desired one of multistage sprockets of the bicycle.

BACKGROUND OF THE INVENTION

Generally, a derailleur for the bicycle comprises a fixing member and a derailleur body provided with; a four link pallalelogram mechanism comprising a support member, two linkage members, and a movable member having a chain guide; and a return spring biasing the movable member with respect to the support member. A control wire is operated to transform the link mechanism to reciprocate the chain guide, so that a driving chain guided therewith is switched to a desired sprocket of a plurality of multistage sprockets for changing the bicycle speed.

The link mechanism is well-known which is supported swingably, other than fixed, to the fixing member through one transverse shaft and has a spring between the fixing member and the support member at the link mechanism. The spring tends to bias the chain guide radially outwardly of the multistage sprockets. Such a derailleur allows its body to swing with respect to the fixing member by use of the balance between the spring force and a change of chain tension caused by a transformation of the link mechanism.

Therefore, the chain guide at the aforesaid conventional derailleur moves following the derailleur body which swings with respect to the fixing member after the link mechanism is transformed. Hence, the chain, when switched, is guided by the chain guide moved by the transformation of the link mechanism and contacts with the lateral side of an adjacent larger diameter sprocket just to engage with the chain, thereby being subjected to a greater surface pressure. As a result, a resistance increases against the speed change to make operation of the wire difficult, thereby creating the problem of generating sounds and causing frequent wearing of the chain and sprockets.

SUMMARY OF THE INVENTION

This invention has been designed in order to overcome the aforesaid problem. An object of the invention is to provide a derailleur for the bicycle, which is controllable by a light operation of the control wire and generates less sound and causes less wear in the sprockets or chain.

For this purpose, a derailleur according to the invention, when the control wire is operated to switch the chain, forces the derailleur body to swing intermittently with respect to a fixing member. Thereafter, the link mechanism is transformed. This invention is characterized in that a support member at the link mechanism is supported swingably with respect to the fixing member. An intermittent feed mechanism is provided between the fixing member and the derailleur body to thereby swing the latter with respect to the fixing member intermittently to the speed change stages. The derailleur body at first swings and then the link mechanism is transformed.

The intermittent feed device comprises a plurality of engaging portions that exceed the number of speed change stages, and a positioning member having an engaging member engageable with one engaging portion. Each engaging portion is disposed in the direction of the swinging motion of the derailleur body with respect to the fixing member, and is shifted in the same direction as a shift of the chain guide by a transformation of the link mechanism.

The engaging portions are provided mainly at the fixing member, and the positioning member is integral with one linkage member, or separate therefrom, connected to the one linkage member in a relationship for changing the relative position thereto of the linkage member.

In the aforesaid construction, the derailleur body, when operated by the control wire, at first swings with respect to the fixing member and then the link mechanism is transformed to move the chain guide axially of the multistage sprockets, whereby the chain guided by the chain guide travels toward a sprocket for engagement, via a longer path. Hence, the chain increases its freedom of motion and the chain guide axially moves carrying the chain. The control wire is easily operated and a proper distance is kept between the sprocket and the chain, thus improving the speed change efficiency in cooperation with the motion of the chain.

Furthermore, the pressure between surfaces when the chain contacts with the sprocket, can be made smaller than that experienced when the chain guide initially moves axially of the sprocket, producing less surfaces in the chain and sprocket and generating less sound.

These and other objects of the invention will become more apparent in the detailed description and examples which follow.

BRIEF DESCRIPTION OF THE DRAWINGS

FIGS. 1 through 7 show an embodiment of a derailleur of the invention, in which

FIG. 1 is a front view of the embodiment,

FIG. 2 is a bottom view thereof,

FIGS. 3 and 4 are bottom views showing the FIG. 1 embodiment in operating conditions, FIG. 5 is a front view of the FIG. 1 embodiment in an operating condition corresponding to FIG. 4, FIG. 6 is a front view of a fixing member only, FIG. 7 is a bottom view of a linkage member only, FIGS. 8 through 15 show a modified embodiment of the invention, in which FIG. 8 is a bottom view of the modified embodiment, FIG. 9 is a sectional view explanatory of a principal portion of the FIG. 8 embodiment, FIG. 10 is a bottom view of a control arm, FIG. 11 is a side view thereof, FIGS. 12 through 15 are bottom view of the FIG. 8 embodiment in operating conditions, FIGS. 16 through 22 shown another modified embodiment, in which FIG. 18 is a rear view thereof, from which a chain guide is removed, FIG. 19 is an enlarged perspective view of a positioning member only, FIG. 20 is a view explanatory of a relationship between the positioning member and an adjusting member.

DETAILED DESCRIPTION OF THE INVENTION

Figure 1:
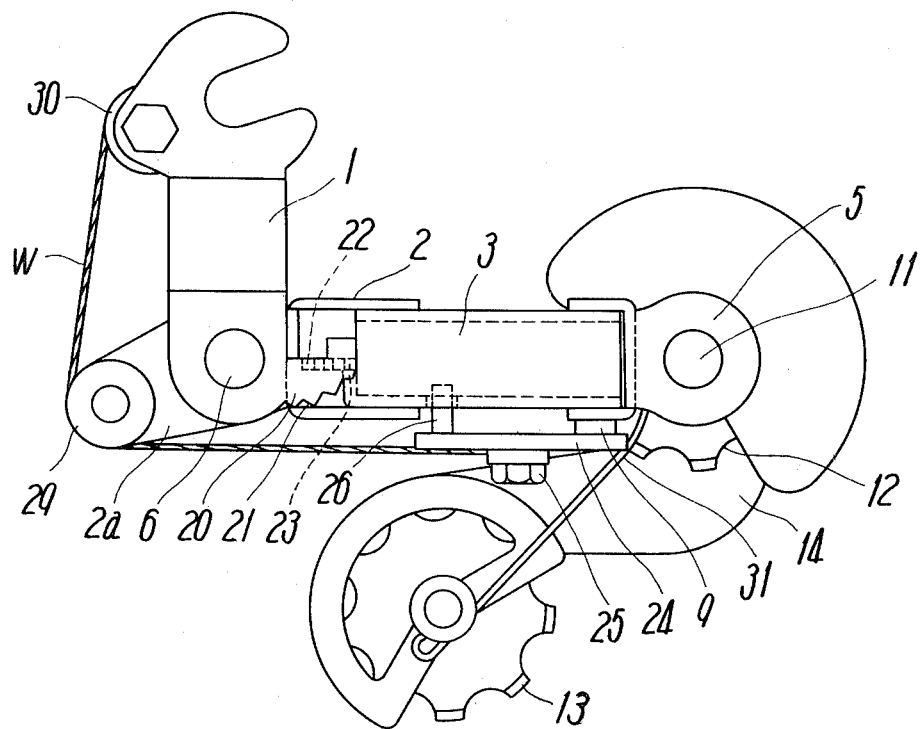
Figure 2:
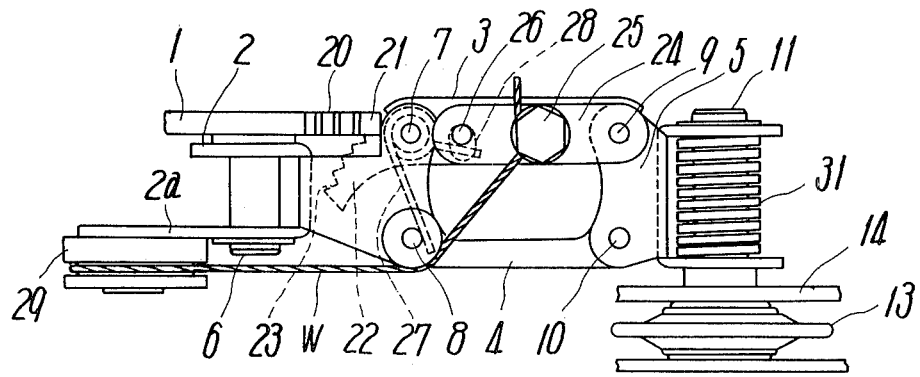

All the drawings show a rear derailleur for a bicycle. The rear derailleur, as shown in FIGS. 1 and 2, fundamentally comprises a fixing member 1 and a derailleur body provided with a four link parallelogram mechanism comprising four members: a support member 2, two parallel linkage members 3 and 4 pivotally connected to the support member 2, and a movable member 5, and a return spring 27 to bias the movable member 5 unidirectionally with respect to the support member 2. The fixing member 1 together with a hub shaft (not shown) is fixed to a fork end (not shown) of the bicycle and the support member 2 is supported swingably to the fixing member 1 through a transverse shaft 6.

The support member 2 has at one side a pair of mounting noses opposite to each other, to which the linkage members 3 and 4 are pivoted through a pair of pins 7 and 8. At free ends of linkage members 3 and 4 is pivoted the movable member 5 through a pair of pins 9 and 10.

The movable member 5 is similar to the support member 2 and has at one side mounting noses opposite to each other, through which noses the movable member is pivoted to the linkage members 3 and 4, and has at the other end a chain guide 14 having two pulleys 12 and 13 and rotatable only in a given range through a transverse shaft 11.

The pulleys 12 and 13 carry a driving chain (not shown) and move axially of the multistage sprockets (not shown) to thereby guide the chain to a desired sprocket for changing the bicycle speed.

The aforesaid construction of the derailleur is well-known and fully understandable.

The derailleur of the invention has no spring between the fixing member 1 and the support member 2 and its derailleur body is freely swingable with respect to the fixing member 1. An intermittent feed mechanism to be hereinafter described is provided between the fixing member 1 and the derailleur body, so that a control wire W is operated to swing the derailleur body with respect to the fixing member 1 intermittently corresponding to the speed change stages, and thereafter the link mechanism is transformed.

The intermittent feed mechanism in the embodiment shown in FIGS. 1 through 7 is provided between the fixing member 1 and the linkage member 3, the fixing member 1 having an extension 20 integral therewith, the linkage member 3 having a positioning member 22. The extension 20 extends toward the linkage member 3 and is provided with a plurality of first engaging portions 21. The positioning member 22 extends toward the fixing member 1 and is provided with a plurality of second engaging portions 23 corresponding to the number of speed change stages and engageable with the first engaging portions 21. A control arm 24 swingable independently of the linkage member 3 is supported to the pin 9 connecting therethrough the movable member 5 and linkage member 3. The wire W is fixed to the arm 24 through a fixture 25, and the return spring 27 is provided between the support member 2 and a pin 26 fixed to arm 24.

Figure 6:
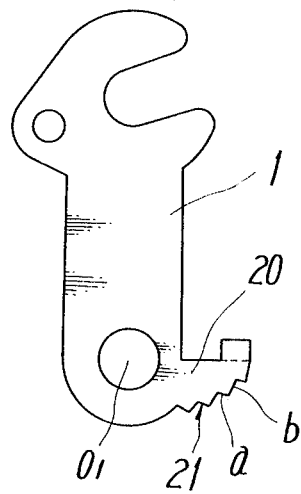
Figure 7:
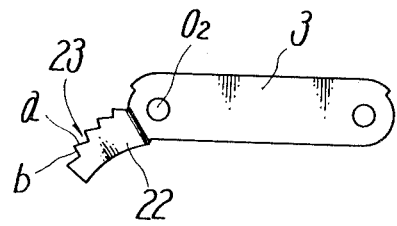

In greater detail, the first and second engaging portions 21 and 23, as shown in FIGS. 6 and 7, each have retaining faces a and slide faces b, the slide faces b at the first engaging portions 21 being formed in a circular arc concentric around the axis $O_1$ of transverse shaft 6 side faces b at the second engaging portions 23 are each formed in a circular arc concentric around the axis $O_2$ of the pivot pin 7.

In other words, the first engaging portions 21 are disposed in the direction of the swinging motion of the derailleur body with respect to fixing member 1, and engage with second engaging portions 23 at positioning member 22, thereby positioning the derailleur body with respect to fixing member 1. The second engaging portions 23 are disposed in a stepped manner in the direction of shifting chain guide 14 caused by a transformation of the link mechanism, thereby positioning the chain guide 14 with respect to support member 2.

The linkage member 3 has an elongate slot 28 into which the pin 26 fixed to the arm 24 is inserted. The return spring 27 winds around pin 7 and is retained at one end to pin 8 and at the other end to pin 26.

The wire W is guided until a control lever (not shown) by way of a first guide 29 at support member 2, and a second guide 30 at fixing member 1, both the guides 29 and 30 being formed of guide rollers respectively. The first guide 29 is supported rotatably to an arm 2a extending from support member 2 opposite to linkage members 3 and 4 with respect to transverse shaft 6. In this instance, a straight line connecting the first guide 29 and wire fixture 25 is positioned below the axis of transverse shaft 6, i.e., the center of the swinging motion of the derailleur body with respect to fixing member 1.

The second guide 30 is provided rotatably at the upper portion of fixing member 1, so that the wire W, when pulled, gives to the link mechanism a moment of rotation clockwise around transverse shaft 6 because the terminal of wire W secured to fixture 25 is pulled.

In addition, in FIGS. 1 through 5, reference numeral 31 designates a tension spring, which applies tension to the chain and biases the link mechanism counter clockwise around transverse shaft 6.

Next, a function of the derailleur constructed as foregoing will be detailed.

Figure 3:
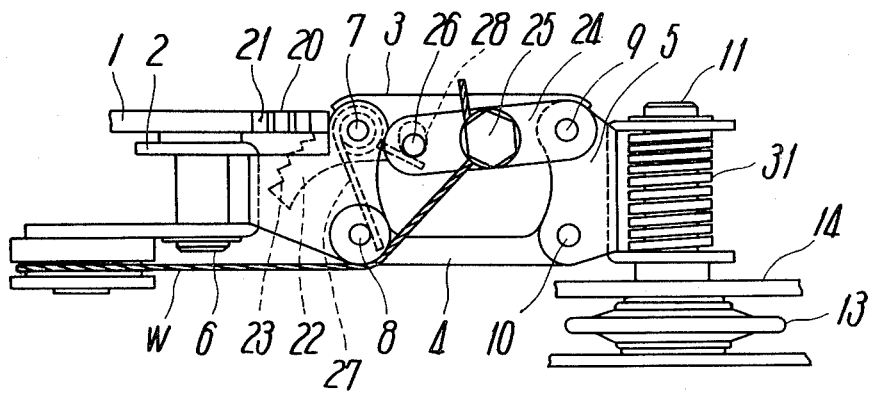

Referring to FIGS. 1 and 2, the chain guide 14 is positioned corresponding to the smallest diameter high speed sprocket, i.e. at the so-called top position. When the wire W is pulled at a stroke necessary for one speed change stage from the high speed sprocket to an adjacent middle speed sprocket, the control arm 24 swings counterclockwise until the pin 26 abuts against the end of slot 28 as shown in FIG. 3. The amount of swinging motion of arm 24 corresponds to a stroke necessary for one speed change stage. The swinging motion of arm 24 allows the return spring 27 to deflect and conserve energy.

When the wire W is further pulled after the pin 26 abuts against the end of slot 28, since a length of wire W from fixture 25 to first guide 29 is essentially reduced, the aforesaid moment of rotation forces the derailleur body to swing around transverse shaft 6 with respect to fixing member 1, thereby shifting the chain guide 14 radially of the multistage sprockets.

In this instance, one slide face b of the second engaging portions 23 at positioning member 22 slides along one slide face b of first engaging portions 21 at extension 20 of fixing member 1, following the swinging motion of the derailleur body. As a result, one retaining face a at second engaging portions 23 leaves that a of the first engaging portions 21, thus permitting the link mechanism to be transformed.

Figure 4:
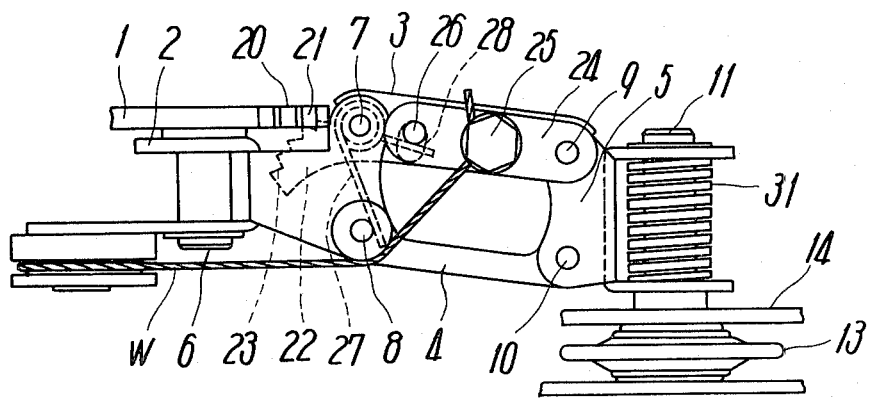
Figure 5:
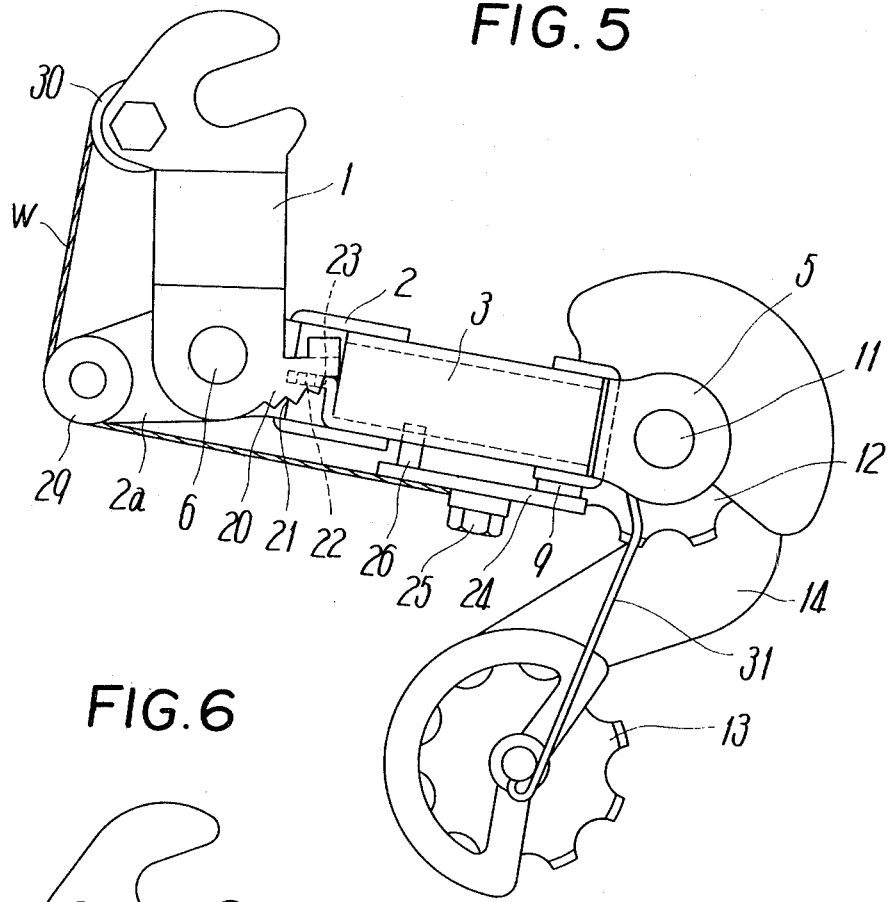

Therefore, the energy stored in return spring 27 transforms the link mechanism as shown in FIG. 4, whereby the chain guide 14 moves at a stroke axially of the multistage sprockets to switch the chain to the middle speed sprocket. In addition, the axial movement of chain guide 14 allows the second engaging portions 23 to be retained at its next retaining face a to the next retaining face a at first engaging portions 21.

A seen from the above, the chain guide 14 at first moves radially of the multistage sprockets and then axially thereof, thereby travelling through a longer path from guide pulley 12 to the sprocket to just mesh the chain and sprocket resulting in an increase in freedom of motion. The chain, when switched with increased freedom of motion, exerts less surface pressure when in contact with the sprocket, thereby ensuring speed changing with an easy operation of the control wire.

Furthermore, in the aforesaid embodiment, the stored energy in spring 27 can rapid-feed the chain guide 14 axially of the multistage sprockets, so that the defect where sounds or frequent wearing in the chain or sprocket due to a slow shift of chain guide 14, is eliminated regardless of operating speed of wire W by a driver.

On the other hand, when the chain is reswitched to the high speed sprocket from the middle speed sprocket, the wire W is released to first transform the link mechanism by means of restoration of return spring 27.

In this instance, linkage members 3 and 4 are swingable freely counterclockwise in FIG. 4 due to the fact that each slide face b at second engaging portions 23 is formed in a circular arc around the axis of pivot pin 7 as shown in FIG. 7, thus enabling the transformation of the link mechanism.

Next, the link mechanism is transformed to disengage second engaging portions 23 from first engaging portions 21, whereby the tension spring 31 functions to swing the derailleur body counterclockwise around transverse shaft 6, thus switching the chain again to the high speed sprocket, at which time the retaining face a at the next stage (high speed stage) of second engaging portions 23 engages with the retaining face a of the next (high speed) stage of first engaging portions 21.

Alternatively, the positioning member 22 may be provided at another linkage member 4 or movable member 5 integrally therewith.

The control arm 24, having the foregoing advantages, need not be provided. Alternatively, the return spring 27 may be separate from an energy conserving spring.

Alternatively, a holder for an outer sheath guiding the control wire may be provided in the vicinity of the guide mounting portion at fixing member 1 or support member 2, so that the holder may act relative to the wire.

Furthermore, the intermittent feed mechanism in the above embodiment, which functions only when the chain guide 14 moves from the high speed sprocket to the low speed one, may reciprocate the chain guide 14 as shown in FIGS. 8 through 15.

Referring to FIGS. 8 through 15, a derailleur is provided with a positioning member 40, the energy saver arm 41 and a wire arm 42, separate from the link mechanism. The positioning member 40 is supported swingably to pivot pin 7 for linkage member 3 and has the second engaging portions 23, and elongate slot 40a and a pin bore 40b. The energy saver arm 41 is pivoted to a pin 43 inserted into the pin bore 40b, and the wire arm 42 is supported swingably to pivot pin 9 for movable member 5 and carries the fixture 25 for wire W. An interlocking pin 44 projects from energy saver arm 41 and perforates through the slot 40a to connect with wire arm 42. An energy saver spring 50 is interposed between the positioning member 40 and the energy saver arm 41. A return spring 51 is located between the positioning member 40 and the support member 2, in turn pin 8, and an auxiliary spring 52 is between the linkage member 4 and the support member 2, in turn pin 7.

Parts in FIGS. 8 through 15, identical with those in FIGS. 1 through 7, are designated by the same reference numerals.

In addition, the tension spring is not shown in FIGS. 8 through 15, which is housed in a tubular shaft 5a provided at movable member 5 and wound around transverse shaft 11 perforating tubular shaft 5a to be retained at one end thereto and at the other end to transverse shaft 11.

If the spring force of the tension spring is expressed by $F_1$, that of energy saver spring 50 by $F_2$, that of return spring 51 by $F_3$, and that of auxiliary spring 52 by $F_4$, these springs have a relationship of $F_1 > F_2 > F_3 > F_4$ therebetween.

Figure 10:
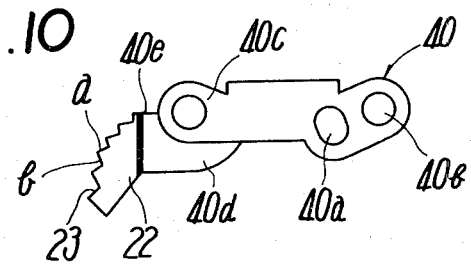
Figure 11:
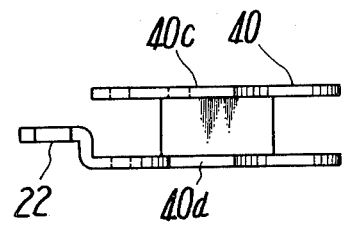

The positioning member 40, as shown in FIGS. 10 and 11, is formed at an intermediate portion into a U-like shape in section and has a pair of opposite plates 40c and 40d. One plate 40d bends at one end upwardly and then extends outwardly at a right angle, and has at the extension the second engaging portions 23. An end face 40e of the upright portion engages with the end face of linkage member 3 to restrict an angle of swinging of positioning member 40. Each slide face b of second engaging portions 23 at positioning member 40 is formed in a circular arc concentric around the axis of pin 7.

Next, the function of the embodiment shown in FIGS. 8 through 15 will be detailed.

Figure 8:
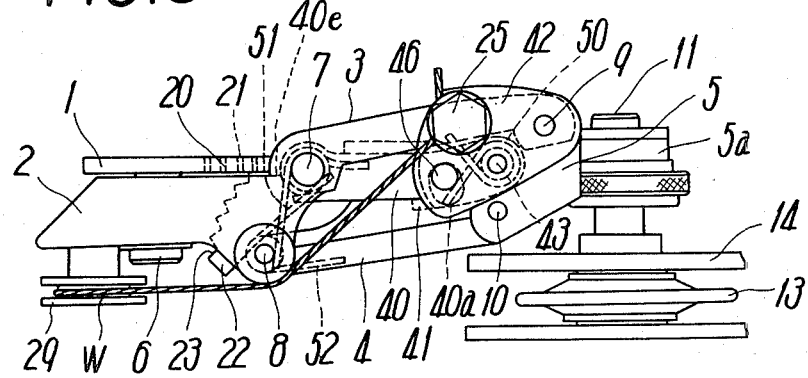
Figure 9:
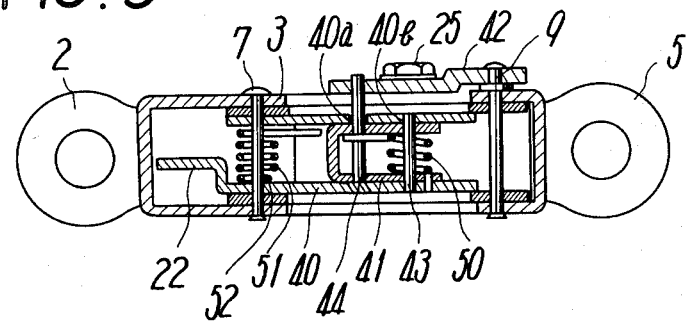
Figure 12:
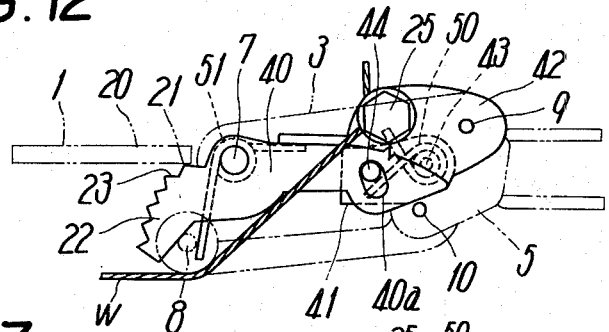
Figure 13:
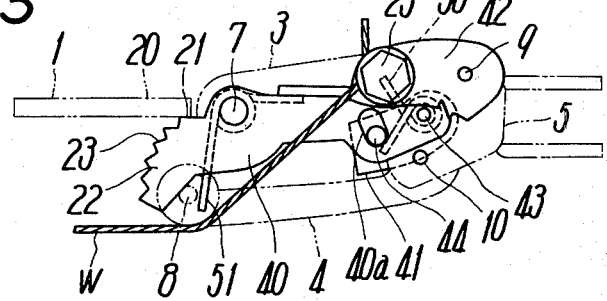

The chain guide 14 shown in FIGS. 8 and 12 is in the top position as the same as in FIG. 2. When the wire W is pulled in this condition, the wire arm 42 together with energy saver arm 41, as shown in FIG. 13, swings counterclockwise through interlocking pin 44, at which time the interlocking pin 44 allows energy saver spring 50 to deflect to conserve energy and abuts against the end of slot 40a. Thus, the arms 41 and 42 end their swinging motions to complete a wire stroke necessary for one speed change stage. Then, the wire W is further pulled so that a length of wire W between the fixture 25 and the first guide 29 is essentially reduced, thereby swinging the derailleur body around transverse shaft 6 with respect to fixing member 1 as the same as the former embodiment, thus shifting chain guide 14 radially of the multistage sprockets.

The above swinging motion of the derailleur body disengages the second engaging portions 23 from the first engaging portions 21, whereby the energy conserved in energy saver spring 50 transforms the link mechanism of derailluer body to move chain guide 14 axially of the multistage sprockets by the rapid feed as in the former embodiment. Thus, the derailleur body is in a condition shown in FIG. 14.

Figure 14:
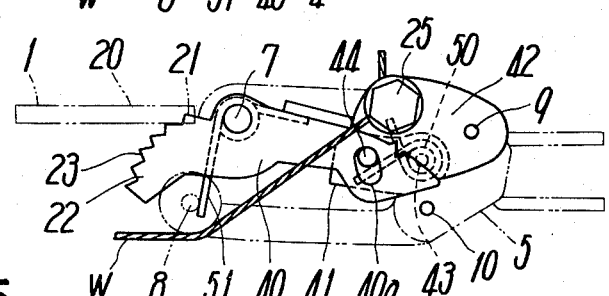
Figure 15:
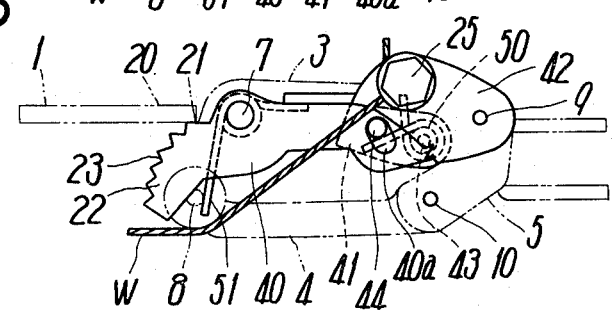
Figure 16:
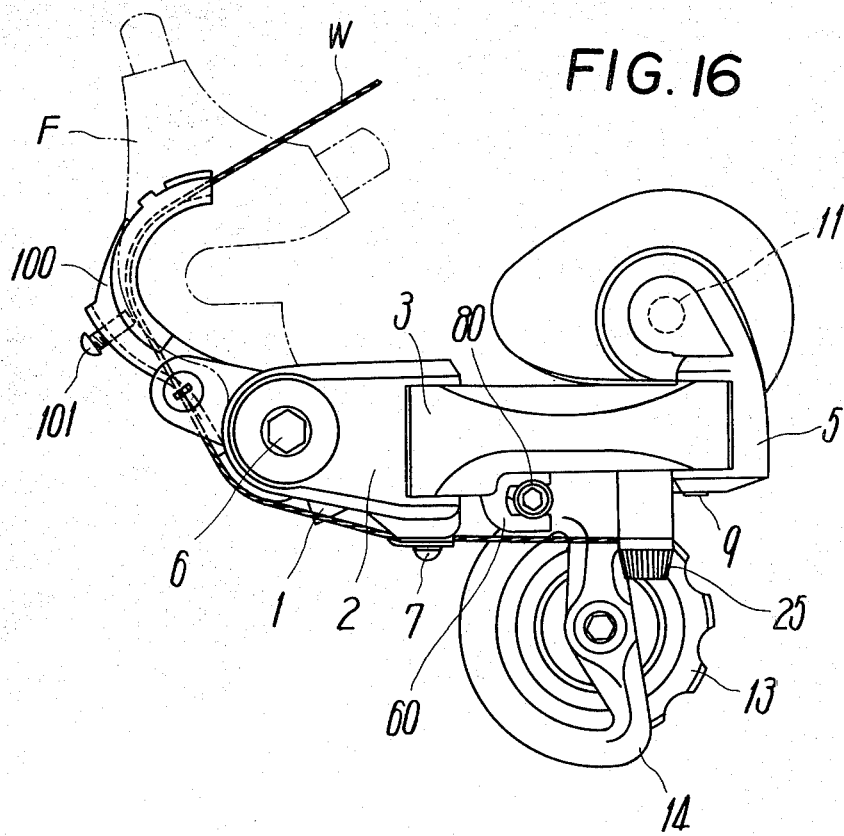
FIG. 16 is a front view thereof.

When the chain guide 14 is intended to return to the top position as shown in FIGS. 8 and 12, the wire W is released and the return spring 51 acts to allow wire arm 14 to swing clockwise in FIG. 14 and allow positioning member 40 to swing counterclockwise, so that the derailleur body is in a condition shown in FIG. 15.

At this time, the linkage members 3 and 4 are free, but the auxiliary spring 52 acts on linkage member 4 to keep stationary the linkage members 3 and 4.

The positioning member 40 swings to disengage the second engaging portions 23 from the first engaging portions 21, so that the tension spring acts to swing the derailleur body counterclockwise around transverse shaft 6 with respect to fixing member 1, and, at first, the chain guide 14 moves radially of the multistage sprockets.

Also, after the derailleur body ends its swinging motion, the return spring 51 functions to transform the link mechanism as shown in FIG. 15, whereby the chain guide 14 shifts axially of the multistage sprockets.

As seen from the above, in this embodiment, when the chain guide 14 moves backward as well as forward, the derailleur body can swing intermittently corresponding to the speed change stages with respect to fixing member 1. Consequently, after the derailleur body swings, the link mechanism is transformed, thereby shifting the chain guide 14 axially of the sprocket.

Alternatively, the positioning members 22 and 40 in the aforesaid embodiments may be formed as shown in FIG. 19.

A positioning member 60 shown in FIG. 19 is separate from the derailluer body and comprises a U-like shaped base 61, an engaging nose 62 extending from the base 61 toward engaging portions 21 at fixing member 1, and a fork 63 extending from the rear side of base 61 toward movable member 5. The pin 8, as shown in FIGS. 17 and 18, is inserted into bores 61a at base 61, thereby supporting positioning member 60 movably relative to linkage member 4.

Figure 17:
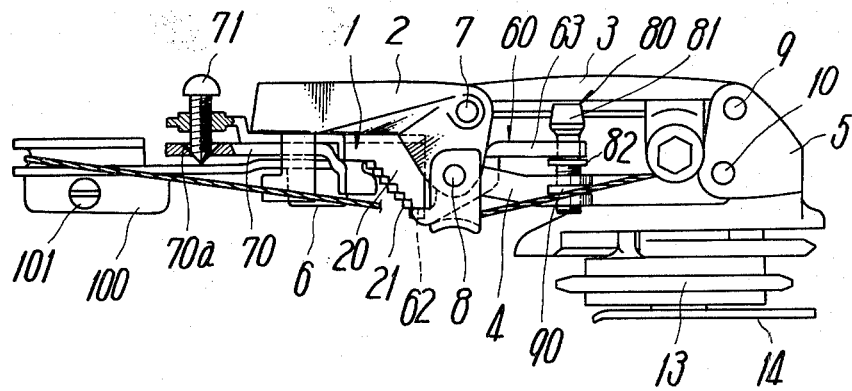
FIG. 17 is a bottom view of the FIG. 16, embodiment.

At one end of fixing member 1 at the linkage member side is provided an extension 20 extending axially of transverse shaft 6 and formed in a circular arc around the shaft 6, the extension 20 being oblique at the end surface as shown in FIG. 17, so that the engaging portions 21 at fixing member 1 are formed in a stepped manner at the oblique end surface.

In other words, the engaging portions 21 are arranged in the swinging direction of the derailleur body with respect to fixing member 1 and displaced in the direction of shifting the chain guide 14 by the transformation of the derailleur body.

A height of each step of engaging portions 21 restricts an amount of shifting the chain guide 14 with respect to support member 2, and, therefore the amount of shifting in the axial direction of the multistage sprockets. A length between each step restricts the amount of the shifting of the derailleur body with respect to fixing member 1, in turn, an amount of shifting the chain gear 14 radially of the multistage sprockets.

Figure 21:
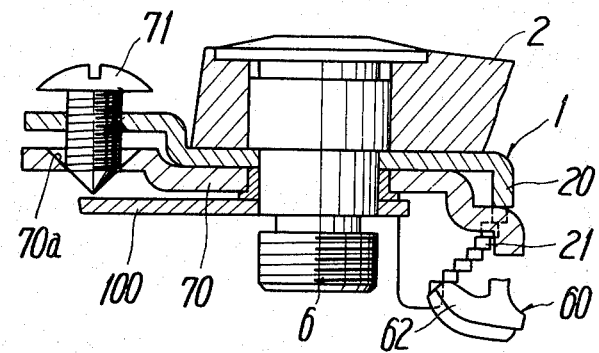
FIG. 21 is a partially enlarged sectional view of an intermittent feed mechanism only.
Figure 22:
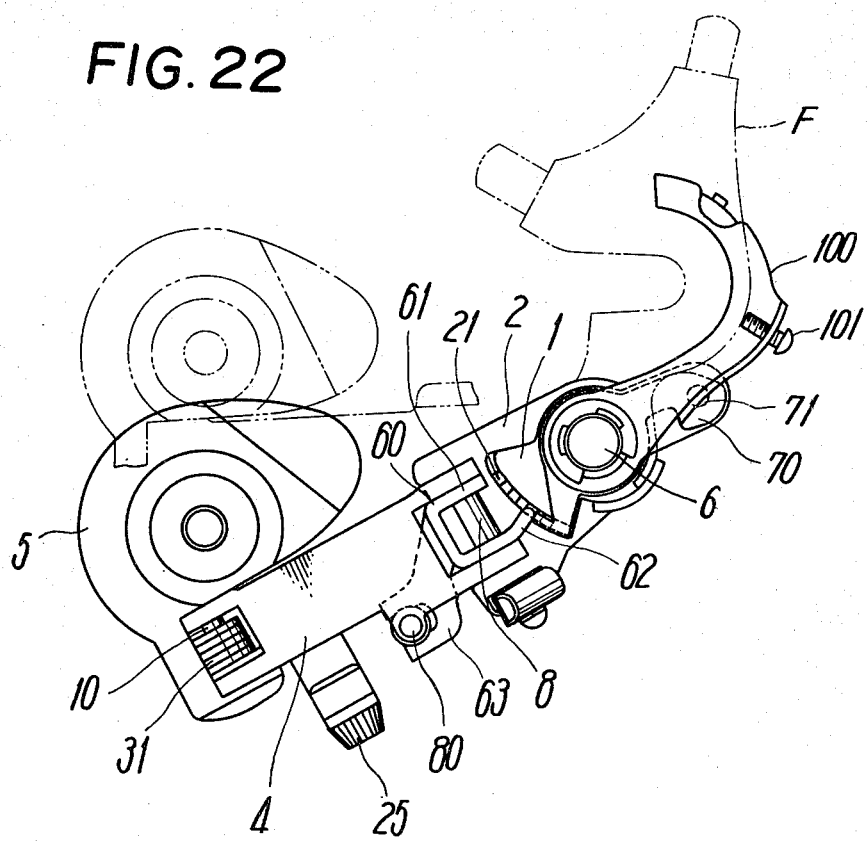
FIG. 22 is a rear view of the FIG. 16 embodiment, showing its operating condition corresponding to FIG. 18.

In the embodiment shown in FIGS. 16 through 22, seven engaging portions 21 are provided. A control 70, which moves in the arrangement direction of engaging portions 21 and controls them into engagement or disengagement, is supported to fixing member 1 swingably around transverse shaft 6. The control 70, as shown in FIG. 21, has a tapered bore 70a and the fixing member 1 has an adjuster 71 screwed therewith. The adjuster 71 has at the tip thereof a tapered engageable portion to fit into the bore 70a and screwably moves to swing the control 70, so that one or two engaging portions 21 at the outside in the arranging direction are controlled into engagement or disengagement.

An adjuster 80, as shown in FIGS. 17 and 20, is screwed with linkage member 4 and has at the head a pair of opposite flanges 81 and 82. An annular groove 83 is formed between the flanges 81 and 82. The annular groove 83 engages with the fork 63 at positioning member 60, thereby keeping positioning member 60 in position with respect to linkage member 4. In this condition, the engaging nose 62 at positioning member 60 engages with engaging portions 21, thereby positioning chain guide 14 with respect to the respective sprockets.

In the aforesaid construction, the relative position of positioning member 60 is adjustable with respect to linkage member 4 by screwable movement of adjuster 80, thereby making the chain guide 14 adjustable in its position axial of the sprocket, the axial position being set by engagement of engaging nose 62 with engaging portions 21.

The linkage member 4, as shown in FIG. 18, extends at one side widthwise outwardly to form a projection, so that the adjuster 80 is screwably supported to the projection by use of a lock washer 90 made from synthetic resin as shown in FIGS. 17 and 20. The flange 81 of adjuster 80 has at the top a square bore 81a for screwably controlling the adjuster 80. The opposite faces of flanges 81 and 82 are made round.

An interval D between the opposite faces of flanges 81 and 82 may be equal to a thickness d of positioning member 60. Alternatively, the interval D may be larger than the thickness d, so that linkage member 4 restricted by positioning member 60 becomes swingable by a difference between the interval D and the thickness d with respect to positioning member 60 even when the engaging nose 62 engages with engaging portions 21 for positioning the linkage member 4.

In other words, when the engaging nose 62 engages with engaging portions 21, the linkage member 4 is biased toward the top position in the drawings by the return spring, whereby the positioning member 60 elastically abuts against the flange 82. In this condition, when the wire W is pulled to move the chain guide 14 to the low speed side, the linkage member 4 at first swings until the flange 81 at the head of adjuster 80 contacts with the positioning member 60. Thereafter, the engaging nose 62 disengages from engaging portions 21, so that the linkage member 4 moves by an amount set by a height of each step at engaging portions 21.

The linkage member 4, even when restricted to its position by engagement of positioning member 60 with engaging portions 21, moves under the positioning condition at an initial pull of wire W as abovementioned. Hence, the linkage member 3 also swings, so that the chain guide 14 can be moved axially of the sprockets in a range of the aforesaid difference between D and d of the allowable swinging motion of linkage member 4 with respect to its defined position.

Accordingly, every time the wire W is pulled, the chain guide 14 moves in a condition of over-shifting beyond the set amount, thereby ensuring a switching of the chain guided by the chain guide 14.

As seen from the above, it is preferable that the aforesaid range of allowable swinging motion of the linkage member 4 is made coincident with an over-shift amount.

The embodiment shown in FIGS. 16 through 22 uses a guide 100 having a curved lead, instead of the guides 29 and 30 of the former embodiments. The guide 100 is supported to fixing member 1 movably in the direction of adjusting tension of wire W, and has an adjuster 101 for adjusting the guide 100 in position with respect to fixing member 1, so that the wire W guided to fixture 25 through adjuster 100 is adjusted in tension.

The adjuster 101, as shown in the drawings, is opposite to a fork end F of the bicycle to which the fixing member is fixed.

The derailleur shown in FIG. 16 through 22, switches the chain in the same manner as the former embodiments that the wire W is operated to swing the derailleur body with respect to fixing member 1 and then the link mechanism at the derailleur body is transformed. Also, the adjuster 80 is operated to adjust the positioning member 60 in position, thereby facilitating adjustment of the chain guide position axial of the sprockets, thus further ensuring a switching of the chain to a desired sprocket.

Furthermore, the adjuster 71 adjusts the control 70 in position with respect to the engaging portions 21, thereby making it possible to simply control the number of sprockets in use corresponding to the number of speed change stages, thereby increasing wide use of one derailleur.

As many apparently widely different embodiments of this invention may be made without departing from the spirit and scope thereof, it is to be understood that the invention is not limited to the specific embodiments thereof except as defined in the appended claims.

What is claimed is:

1. A derailleur for shifting a chain among the sprockets of a multistage sprocket assembly comprising:
   (a) a fixing member fixed to a frame of the bicycle;
   (b) a derailleur body being provided with a four link parallelogram mechanism comprising a support member, a pair of linkage members connected pivotably to said support member, and a movable member which has a chain guide and is connected pivotably to said linkage members, and with a return spring for biasing said movable member unidirectionally with respect to said support member, said derailleur body being supported swingably with respect to said fixing member through said support member, said chain guide at said derailleur body being supported swingably with respect to said movable member, said movable member and chain guide having therebetween a tension spring, said spring biasing said derailleur body counterclockwise with respect to said fixing member, a member at said derailleur body operable with respect to said support member thereat, having a fixture for a control wire which is operated to transform said derailleur body against said return spring and move said chain guide axially of said sprockets, and swing said derailleur body with respect to said fixing member against said tension spring, to move said chair guide radially of said sprockets; and
   (c) an intermittent feed mechanism interposed between said fixing member and said derailleur body, said mechanism being operated by said wire to swing said derailleur body intermittently corresponding to the speed change stages with respect to said fixing member, and to transform said derailleur body after a swinging motion thereof.

2. A derailleur for a bicycle according to claim 1, wherein said intermittent feed mechanism comprises; a plurality of engaging portions at least equal in number to the number of speed change stages; and a positioning member which has an engaging member engageable with one of said engaging portions and positions said derailleur body with respect to said fixing member; each of said engaging portions being disposed in the swinging direction of said derailleur body with respect to said fixing member and displaced in the same direction as the displacement of said chain guide resulting from the transformation of said derailleur body.

3. A derailleur for a bicycle according to claim 1, wherein said intermittent feed mechanism has a control member mounted to move in the direction of said engaging portions for engaging or disengaging said engaging portions.

4. A derailleur for a bicycle according to claim 3, wherein said control member includes an adjusting mechanism for adjusting a control position of said control member with respect to said engaging portions.

5. A derailleur for a bicycle according to claim 1, wherein each engaging portion of said intermittent feed mechanism is provided at said fixing member, said positioning member being provided at one of said linkage members at said derailleur body.

6. A derailleur for a bicycle according to claim 5, wherein said positioning member is integral with one of said linkage members at said derailleur body.

7. A derailleur for a bicycle according to claim 5, wherein said positioning member is formed separately from said linkage members at said derailleur body, and coupled with one of said linkage members.

8. A derailleur for a bicycle according to claim 7, wherein said positioning member is supported to said derailleur body movable relative to said linkage members, one of said linkage members having an adjuster for adjusting said positioning member in its relative position to said linkage members.

9. A derailleur for a bicycle according to claim 8, wherein said positioning member has a fork, said adjuster comprises a headed screw, said screw having at its head an annular groove engageable with said fork.

10. A derailleur for a bicycle according to claim 1, wherein said derailleur body has at a member thereof operating with respect to said support member a control arm swinging independently of said operable member, said arm being provided with a fixture for said wire and, an energy saver spring being disposed between said support member and said arm.

11. A derailleur for a bicycle according to claim 1, wherein said derailleur body supports a positioning member swingable independently with respect to each of said members constituting said derailleur body and a wire arm having a fixture for said wire, so that an energy saver spring for transmitting a motion of said wire arm to said positioning member is interposed between said positioning member and said wire arm, and a return spring is interposed between said positioning member and said derailleur body.

12. A derailleur for a bicycle according to claim 1, wherein said support member at said derailleur body includes a guide for said wire, so that a straight line path connecting said guide and said fixture for said wire is positioned below the center of swinging motion of said derailleur body with respect to said fixing member.

13. A derailleur for a bicycle according to claim 12, wherein said fixing member includes said guide for said wire.

14. A derailleur for a bicycle according to claim 13, wherein said guide at said fixing member is provided with a curved lead and supported movably with respect to said fixing member in the direction of adjusting tension of said wire, said guide having an adjuster for adjusting said lead in position with respect to said fixing member.

* * * * *